(12) United States Patent
Hunt et al.

(10) Patent No.: US 8,637,780 B2
(45) Date of Patent: Jan. 28, 2014

(54) PORTAL AND METHOD FOR STORING CABLES FOR ELECTRONIC DEVICES

(75) Inventors: Thomas A. Hunt, Encinitas, CA (US); Thomas E. Veloskey, San Marcos, CA (US)

(73) Assignee: Spectrum Concepts, Inc., Vista, CA (US)

( * ) Notice: Subject to any disclaimer, the term of this patent is extended or adjusted under 35 U.S.C. 154(b) by 126 days.

(21) Appl. No.: 13/433,238

(22) Filed: Mar. 28, 2012

(65) Prior Publication Data
US 2012/0246868 A1 Oct. 4, 2012

Related U.S. Application Data

(60) Provisional application No. 61/470,322, filed on Mar. 31, 2011.

(51) Int. Cl.
*H02G 3/08* (2006.01)

(52) U.S. Cl.
USPC ........... 174/483; 174/650; 248/200; 52/220.8

(58) Field of Classification Search
USPC ........... 174/483, 650, 652, 485.486; 248/200; 52/220.8; 439/538
See application file for complete search history.

(56) References Cited

U.S. PATENT DOCUMENTS

| 4,091,231 | A | * | 5/1978 | Sotolongo | 174/483 |
| 4,908,482 | A | * | 3/1990 | Shimirak et al. | 174/93 |
| 6,416,336 | B1 | * | 7/2002 | Schulte et al. | 439/131 |
| 2008/0054135 | A1 | | 3/2008 | Galasso et al. | |
| 2009/0159308 | A1 | | 6/2009 | Thibault et al. | |

FOREIGN PATENT DOCUMENTS

EP 2456031 5/2012

* cited by examiner

*Primary Examiner* — Dhirubhai R Patel
(74) *Attorney, Agent, or Firm* — Bernard L. Kleinke; Duckor Spradling Metzger & Wynne

(57) ABSTRACT

A portal and method facilitate routing and holding at least one electrical cable having a plug end. The portal may include a body which fits into a hole in a mounting surface and has a cable opening therein. A closure member moves between a closed position and an open position relative to the cable opening. A retainer movably mounted to the closure member confines the cable in a desired position to inhibit the plug end from moving back toward the interior of the portal body and to permit the plug end to be pulled substantially freely away from the body.

19 Claims, 15 Drawing Sheets

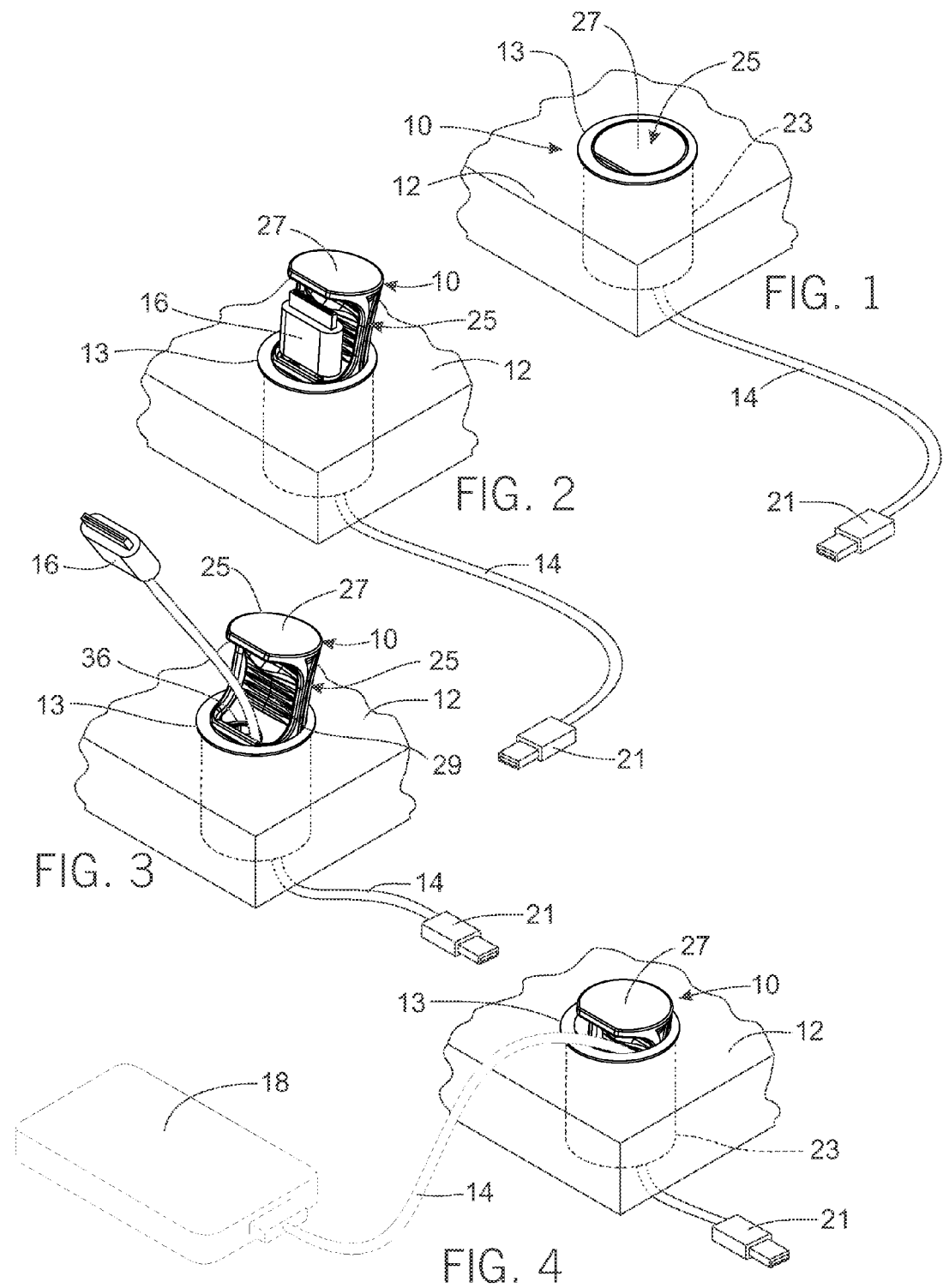

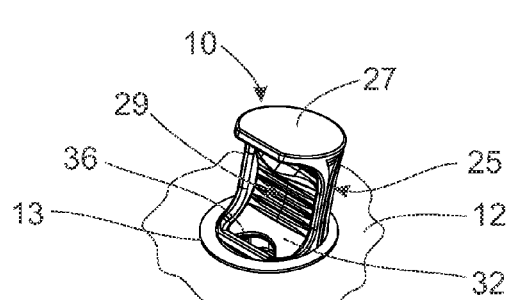
FIG. 5
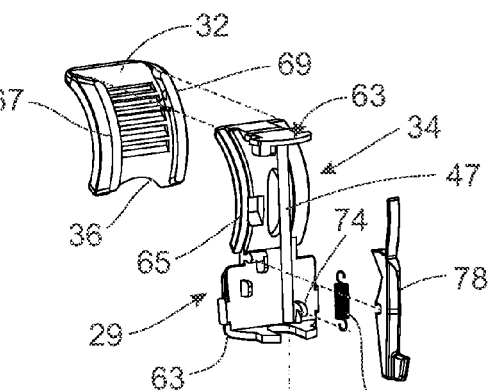
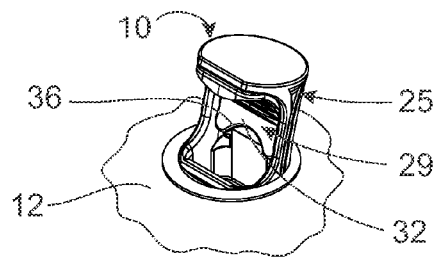
FIG. 6
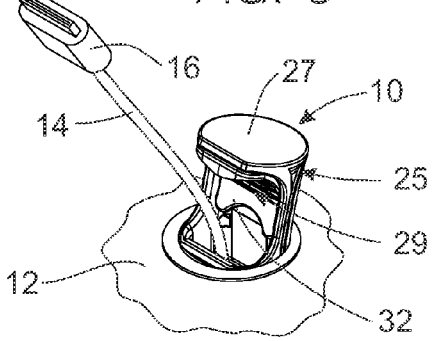
FIG. 7
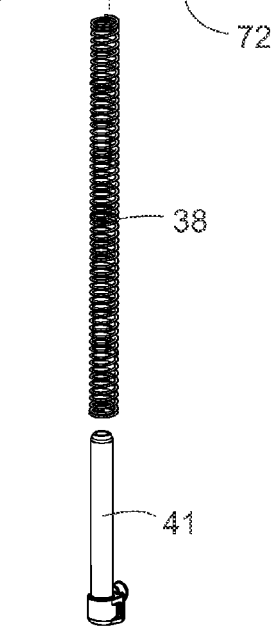
FIG. 9
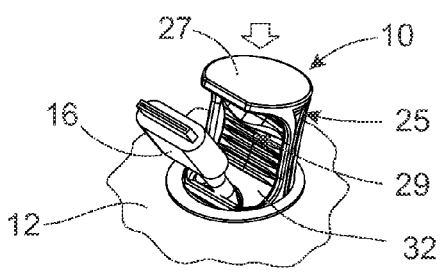
FIG. 8
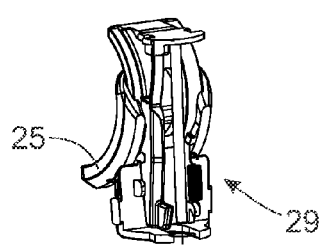
FIG. 10

Section D-D

Section A-A

Section B-B

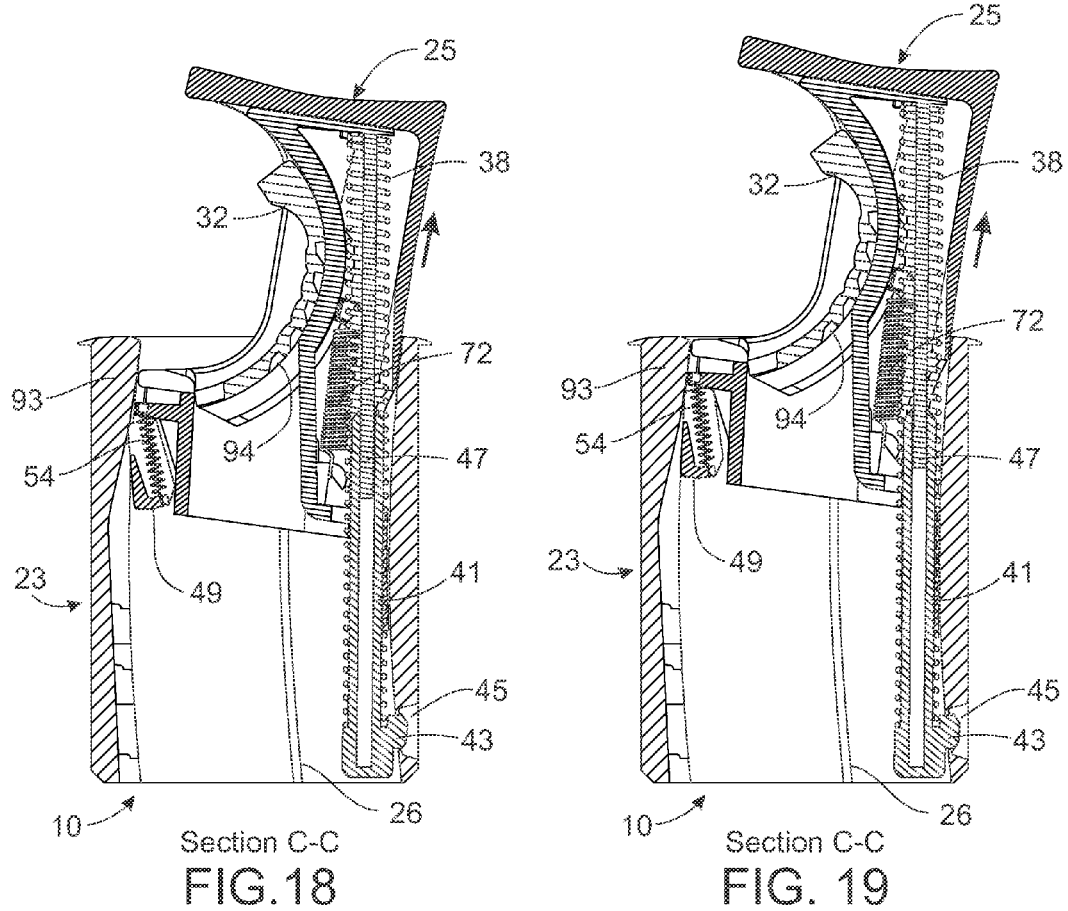

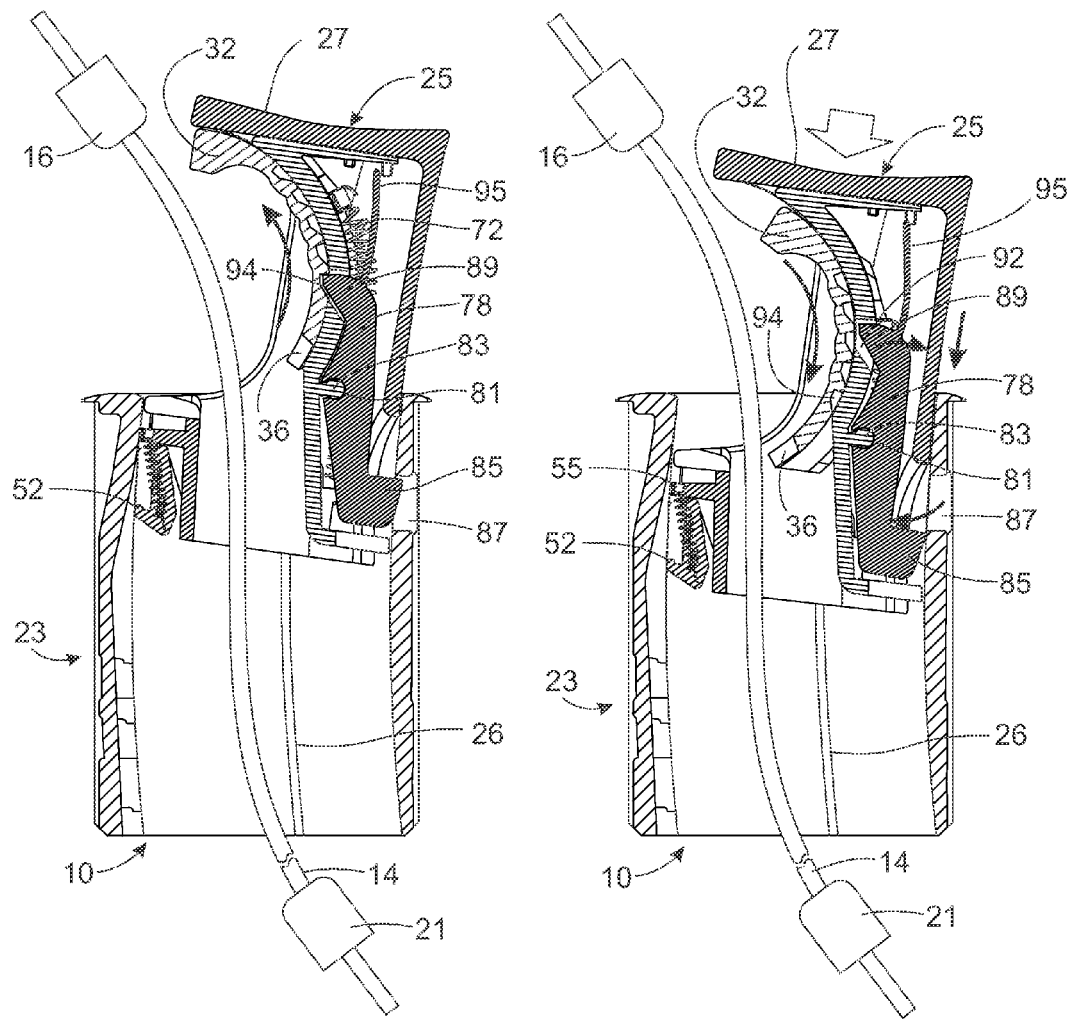

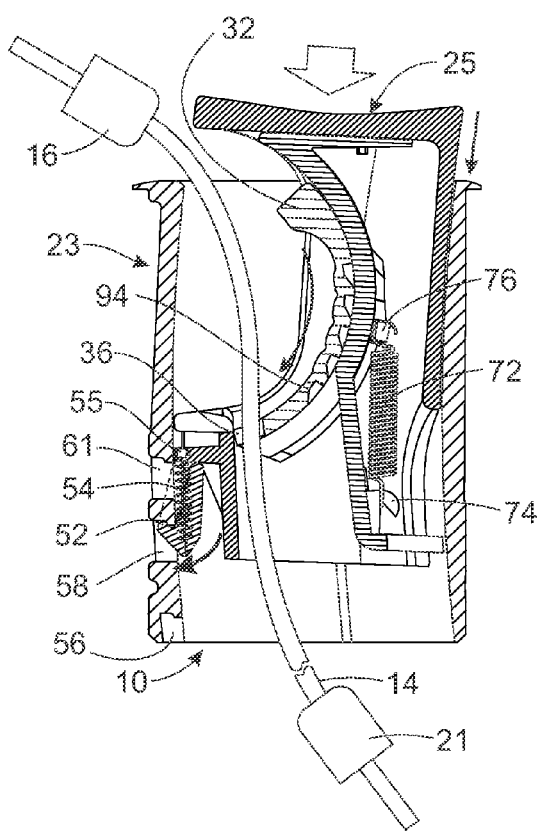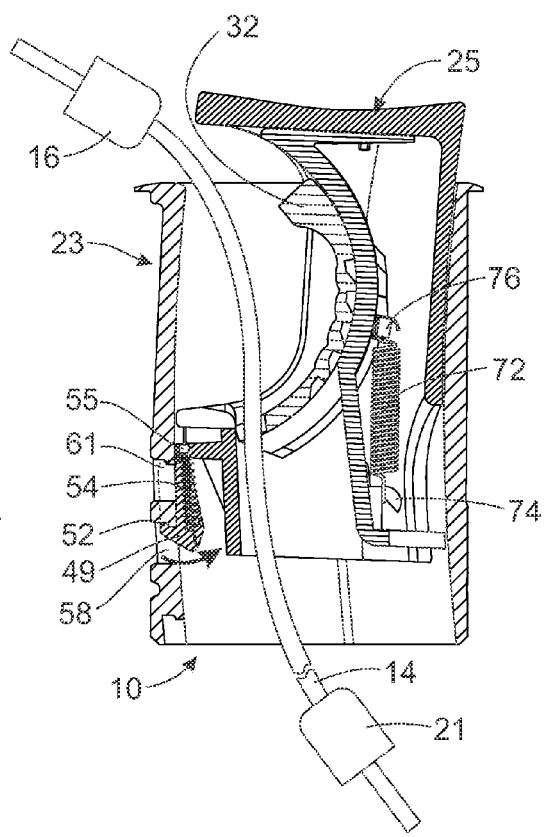
Section B-B
FIG. 22
Section B-B
FIG. 23

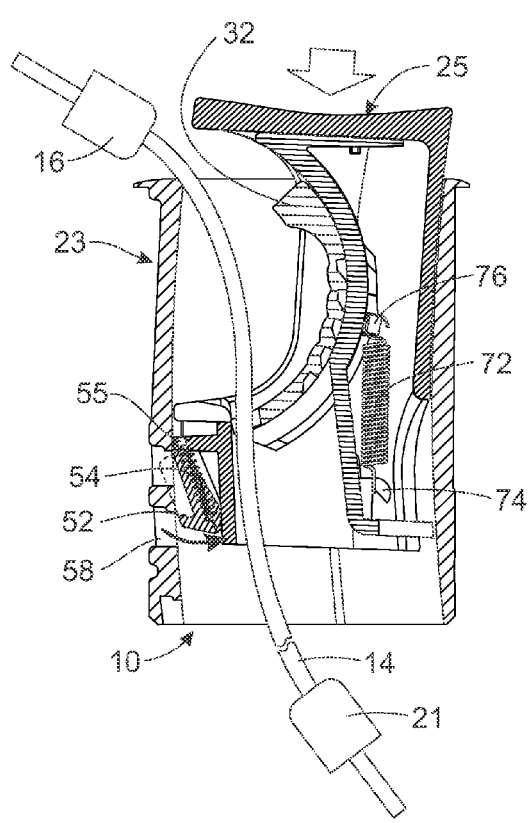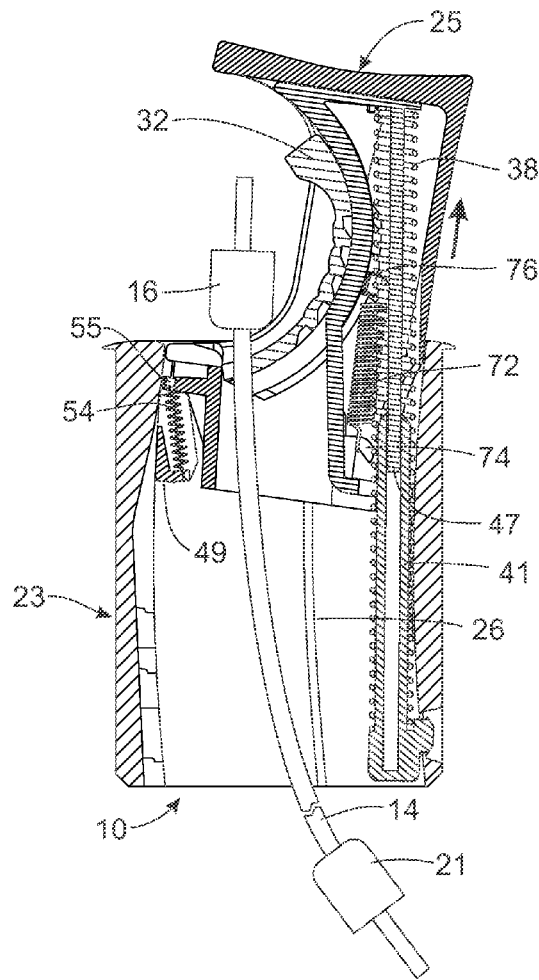
Section B-B
FIG. 24
Section C-C
FIG. 25

Section B-B

Section B-B

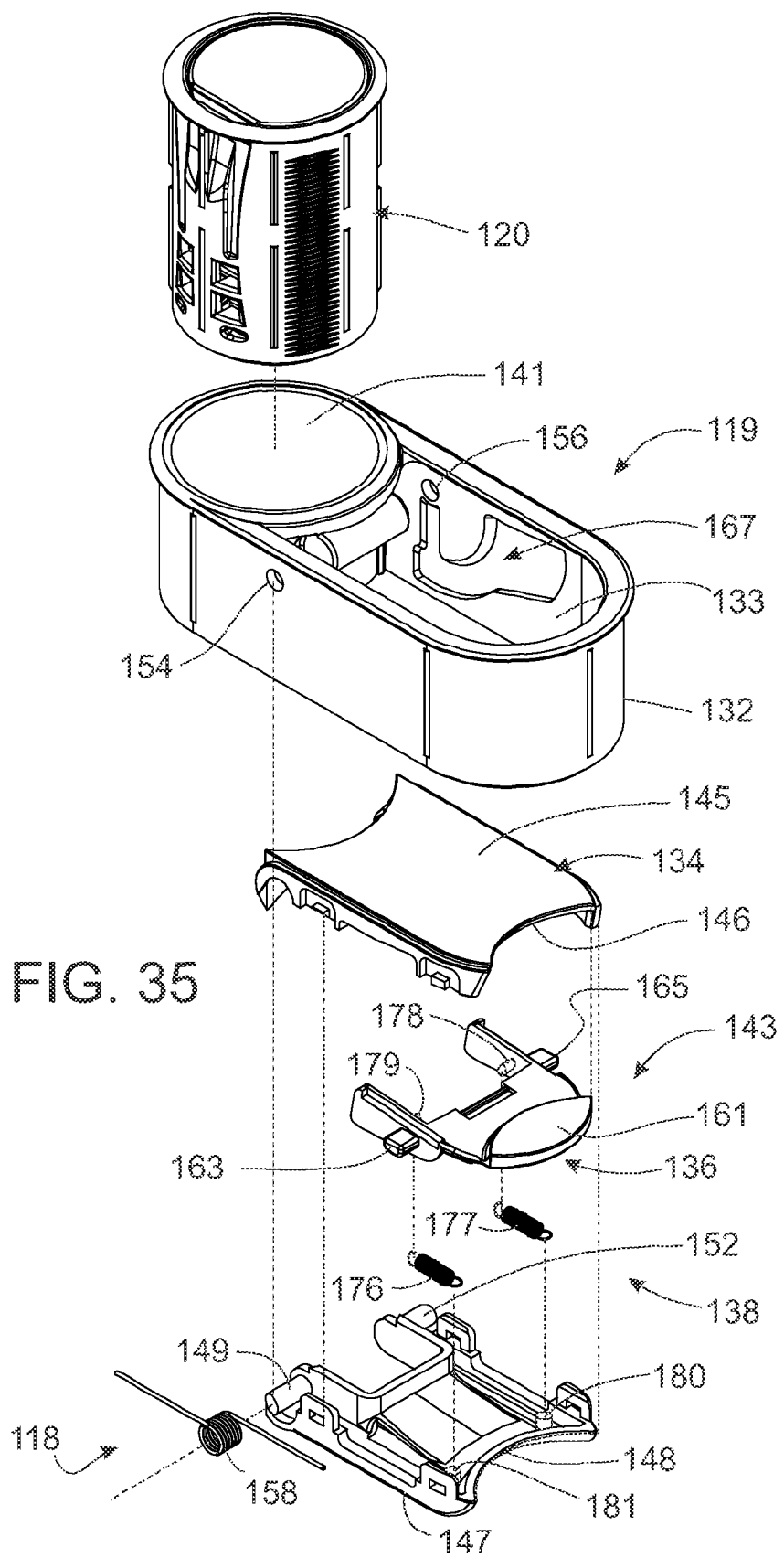

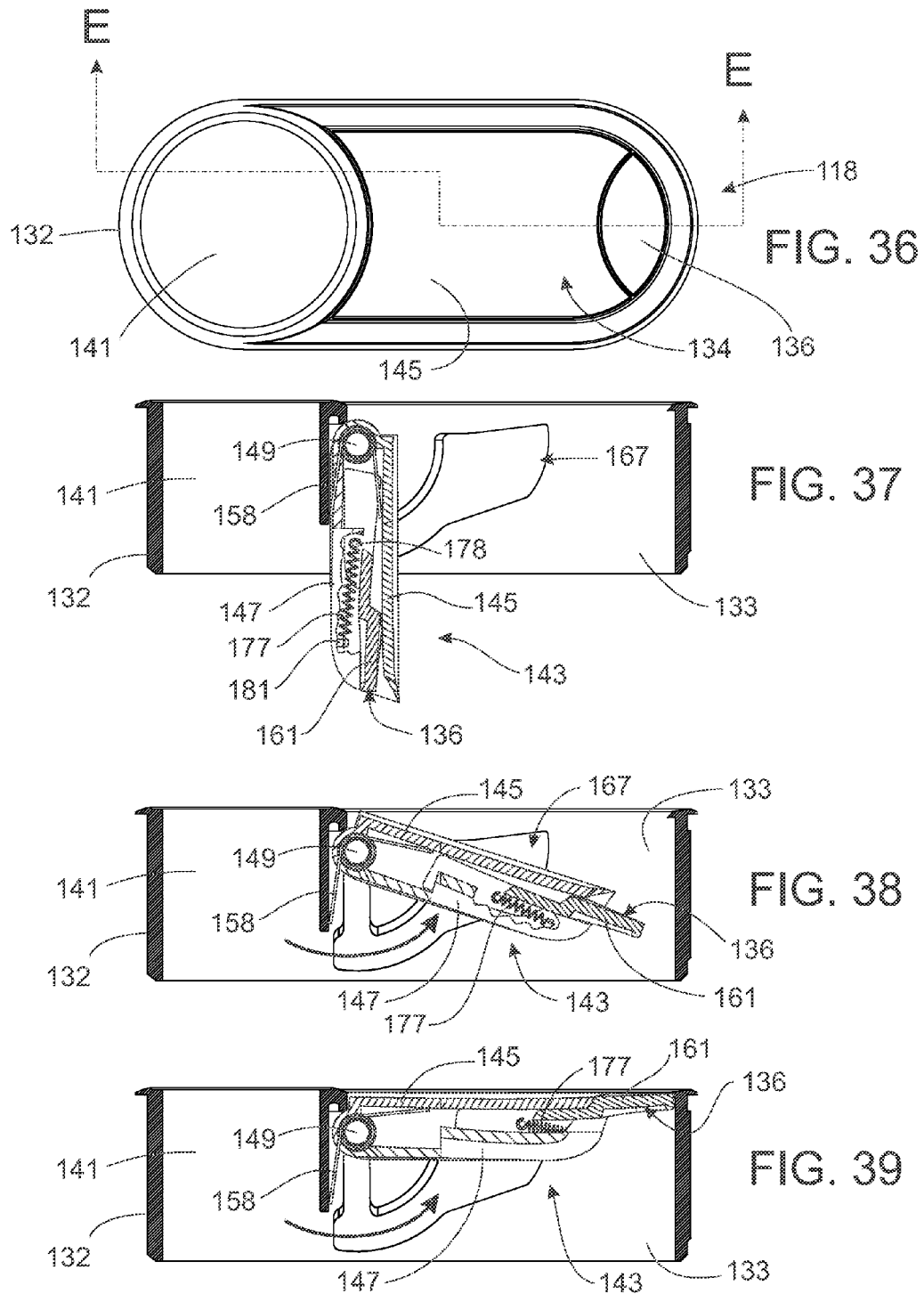

PORTAL AND METHOD FOR STORING CABLES FOR ELECTRONIC DEVICES

RELATED APPLICATION

This application claims priority to U.S. provisional patent application No. 61/470,322, which is entitled "DEVICE FOR STORING CABLES FOR PORTABLE ELECTRONIC DEVICES."

FIELD OF THE INVENTION

The present invention in general relates to a portal and method of using it. It more particularly relates to a portal and method for the storage and access of electrical cables for use with electronic devices.

BACKGROUND OF THE INVENTION

There is no admission that the background art disclosed in this section legally constitutes prior art.

There have been many different types and kinds of portals for cables and the like. Reference may be made to the following U.S. Pat. Nos. 3,966,073; 4,688,491; 4,950,839; 5,167,047; 5,860,713; 6,254,427; 6,393,658; 6,895,634; 7,383,610; 7,390,979; and 7,788,766; as well as European patent 1,746,699 and Japanese patent application 07287446.

While a variety of portals have been shown and described in prior patents, there still has existed a long felt need for a device that can be easily and unobtrusively added to a variety of existing furniture where users have already become accustomed to connecting and parking their portable devices. Manufacturers and marketers of desks and furniture have also sought a solution for managing the needs of these portable devices which may be easy to install without adding significant manufacturing cost.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIGS. 1 through 4 are pictorial views of a portal, which is constructed in accordance with an embodiment of the invention, and which illustrates the device as it progresses from its closed position to a position where a cable can be used to activate or charge an electronic device;

FIGS. 5 through 8 are pictorial views of the portal of FIG. 1 illustrating it in the process of receiving a cable;

FIG. 9 is an exploded view of the retainer assembly of the portal of FIG. 1;

FIG. 10 is an assembled pictorial view of the retainer assembly of FIG. 9;

FIGS. 14 through 27 are sectional views taken along the indicated lines in FIG. 13, illustrating the portal in various positions in connection with its method of operation;

FIG. 35 is an exploded view of the portal assembly of FIG. 31;

FIG. 36 is a plan view of the portal assembly of FIG. 31;

FIGS. 37 through 39 are sectional views of the portal assembly of FIG. 36;

DETAILED DESCRIPTION OF CERTAIN EMBODIMENTS OF THE INVENTION

Figure 11:
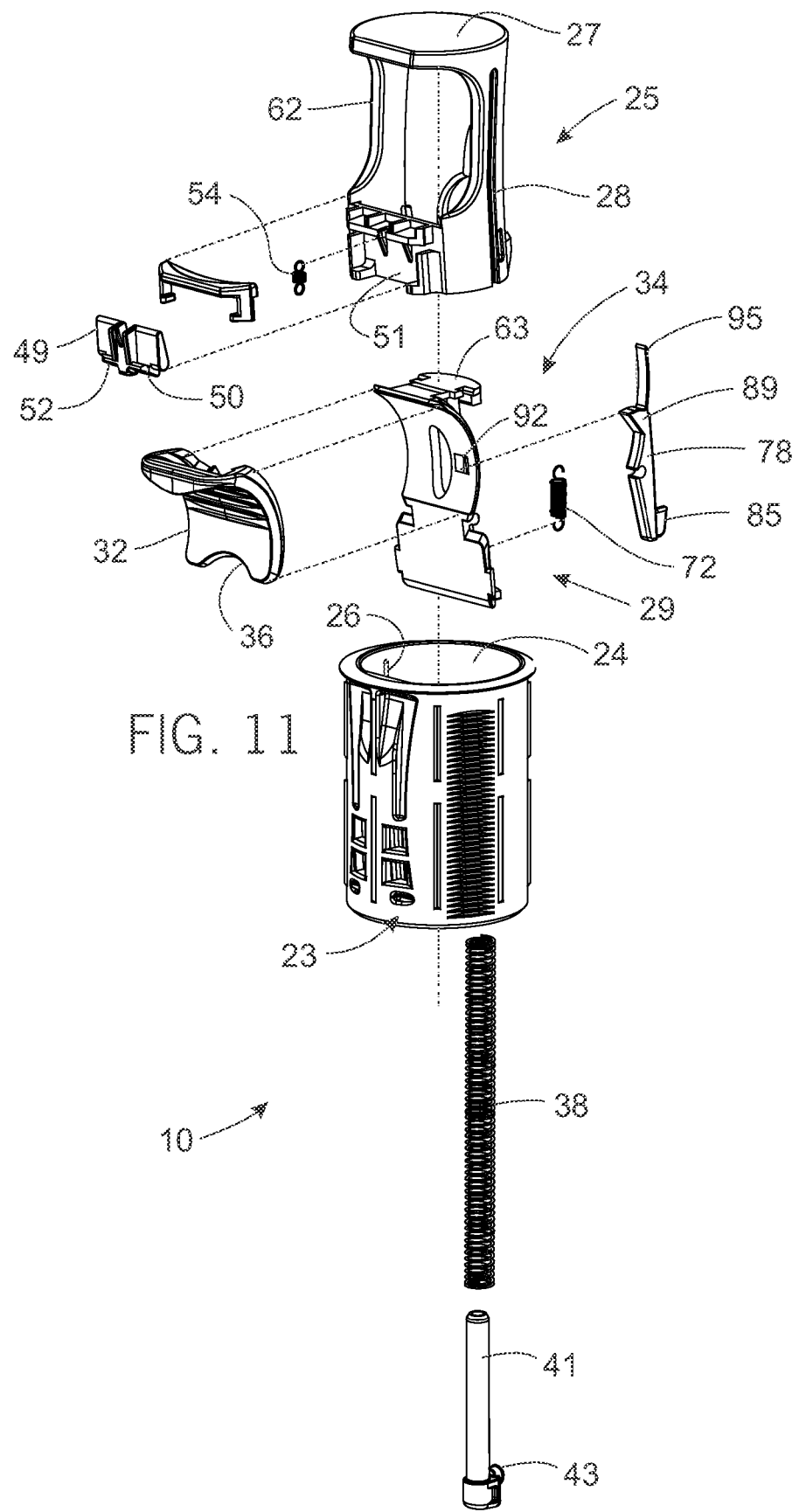
FIG. 11 is an exploded view of the portal of FIG. 1.
Figure 12:
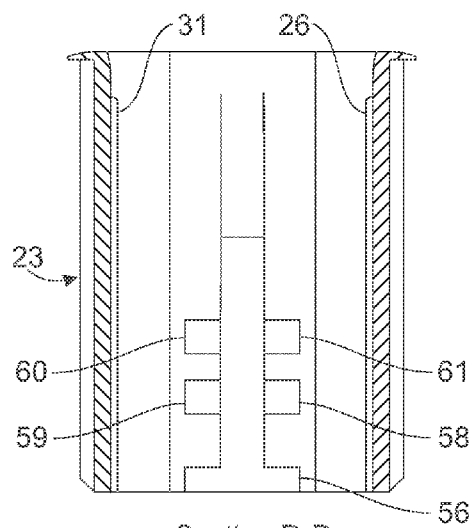
FIG. 12 is a sectional view of a body of the portal of FIG. 1 taken substantially on line D-D thereof.
Figure 13:
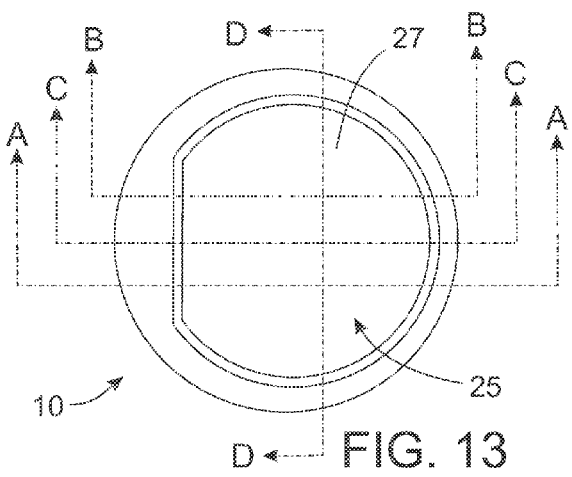
FIG. 13 is an enlarged plan view the portal of FIG. 1.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

A portal and method enable cables to be routed relative to a mounting surface. The portal includes a body for fitting into a hole in the mounting surface and a closure member for moving between a closed position and an opened position. The closed position is one where the closure member is substantially coplanar with the mounting surface. A retainer movably mounted to the closure member confines the cable in a desired position. A retainer drive mechanism moves the retainer as the closure member moves from its opened position to its closed position to confine the cable in the desired position to inhibit the cable plug end from moving back into the portal body and for permitting the plug end to be pulled manually away from the portal body.

According to an embodiment of the invention, a portal facilitates routing electrical cables, each having a plug end. A body fits into a mounting surface hole. A closure member moves between a closed position and an opened position. A movable retainer confines the cable in a desired position to prevent the plug end from moving back into the portal body and for permitting the cable to be pulled manually substantially freely upwardly away from the cable opening when the closure is disposed in its closed position. A retainer drive mechanism moves the retainer toward the cable as the closure member moves to its closed addition.

According to another embodiment of the invention, a portal facilitates routing electrical cables, each having a plug end. A hollow body fits into a mounting surface hole. A closure member moves between a closed position and an opened position. A retainer confines the cable in a desired position to cause the closure member to carry the plug end away from the body to present the cable to the user and to inhibit the plug end from moving back into the interior of the body. Thus, the plug end can be pulled manually substantially freely away from the body after being presented to the user.

According to a further embodiment of the invention, a method is employed for routing electrical cables using a portal. The method includes confining a cable in a desired position, and moving a retainer as a portal closure member moves from its opened position toward its closed position to confine the cable in the desired position and to inhibit the cable plug end from moving back into the interior of the portal body and for permitting the cable plug end to be pulled substantially freely away from the body.

Referring now to the drawings, and more particularly to FIGS. 1 through 27 thereof, there is shown a portal 10, which is constructed in accordance with an embodiment of the invention, and which may be mounted to a mounting surface 12 in a hole or opening 13 therein. The portal 10 facilitates the routing of electrical cables, such as a cable 14 having a plug end 16 for electrically coupling to an electronic device 18 such as a smart telephone or other such electronic device. A connector 21 on the opposite end of the cable 14 may be connected to a power source or the like, whereby the electronic device 18 may be powered or charged electrically.

As hereinafter described in greater detail, the portal 10 may be mounted to a horizontal surface such as the top surface of a desk. As indicated in the drawings, when the portal is mounted to a horizontal surface such as the surface 12, the portal 10 may be disposed in its closed position as shown in FIG. 1 in a coplaner or flush manner with the top surface of the mounting surface 12. In this position, the portal 10 and the cable 14 may be unobtrusively stored away to leave the upper surface 12 uncluttered. When moved to its opened position as shown in FIG. 2, the plug end 16 is presented to the user by carrying it conveniently above the mounting surface 12. Thereafter, the portal 10 may be moved to a position where the cable 14 extends from the mounting surface 12 to the electronic device 18. It should be understood that the portal 10 may be mounted to other surfaces which may not be horizontal. For example, the portal may be mounted to a vertical surface or other angular surface (not shown).

As best seen in FIG. 11, the portal 10 may include a hollow tubular body 23, which is fixed within the mounting surface hole, and which is generally circular throughout its axial length, and which is adapted to fit within the circular hole 13 in the mounting surface 12. It should be understood that other shapes of the body 23 may also be employed. The body 23 may include a top cable opening 24 through which may extend the cable 18. A movable closure member 25 may be slidably mounted within the body 23 in a telescoping manner, and includes a flat top portion 27 which is disposed coplanar with the mounting surface 12 when the portal 10 is disposed in its closed position as shown in FIG. 1. In order to facilitate axial telescoping movement of the closure member within the body 23, a pair of oppositely disposed internal axial ribs 26 and 31 may fit into a pair of axially extending grooves such as the groove 28 (FIG. 11) on the closure member 25 receiving the rib 31. The ribs and grooves may be slightly curved toward the back of the portal 10 to enable the closure member to rise upwardly in a slightly inclined attitude to present the plug end 16 angularly upwardly as shown in FIG. 3.

Figure 14:
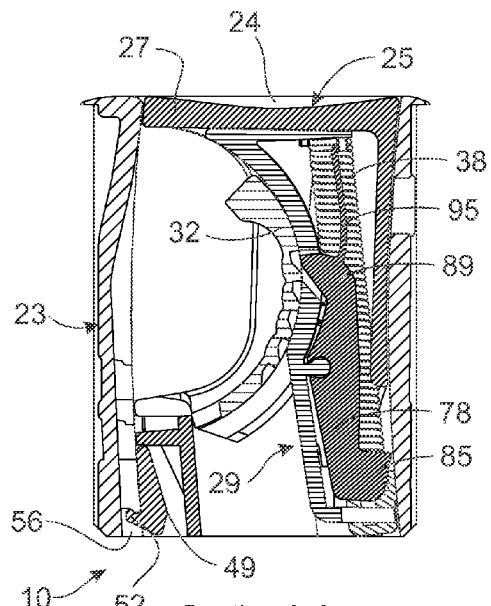

A retainer assembly 29 may include a movable retainer 32 to help confine the cable 14 as the closure member 25 moves the plug end 16 toward and away from the body 23. A retainer drive mechanism 34 may advance and retract the retainer 32 toward and away from the cable 14. The retainer 32 may include a C-shaped cut out 36 at the bottom end portion thereof as best seen in FIG. 3 for the purpose of confining the cable 14 within the movable closure member 25. The retainer drive mechanism 34 includes a coil spring 38 for moving the closure member 26 upwardly telescopically within the fixed body 23 when the movable closure member 25 is released from its stored position as shown in FIG. 1. When released, the movable closure member 25 snaps upwardly into the position as shown in FIG. 2 to carry the plug end 16 for presenting it to the user. When the closure member is pushed downwardly into it closed position as shown in FIG. 14 or into its intermediate closed position as shown in FIGS. 4 and 22, the spring 38 is compressed.

An axial tube 41 may stand upright within the body 23 and has a foot 43 extending through a body opening 45 as shown in FIG. 18 to secure it within the body 23 so that it receives the coil spring 38. A rod 47, as shown in FIGS. 9 and 18, depends from the closure member 25 within the tube 41 at the upper end thereof to help serve as a damper. A high viscosity lubricant such as a suitable grease may be disposed within the tube 41 to create a frictional damper to slow the up and down movement of the closure member.

Figure 15:
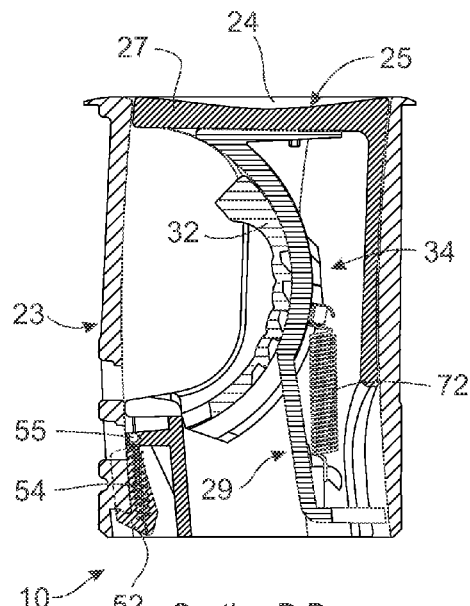
Figure 16:
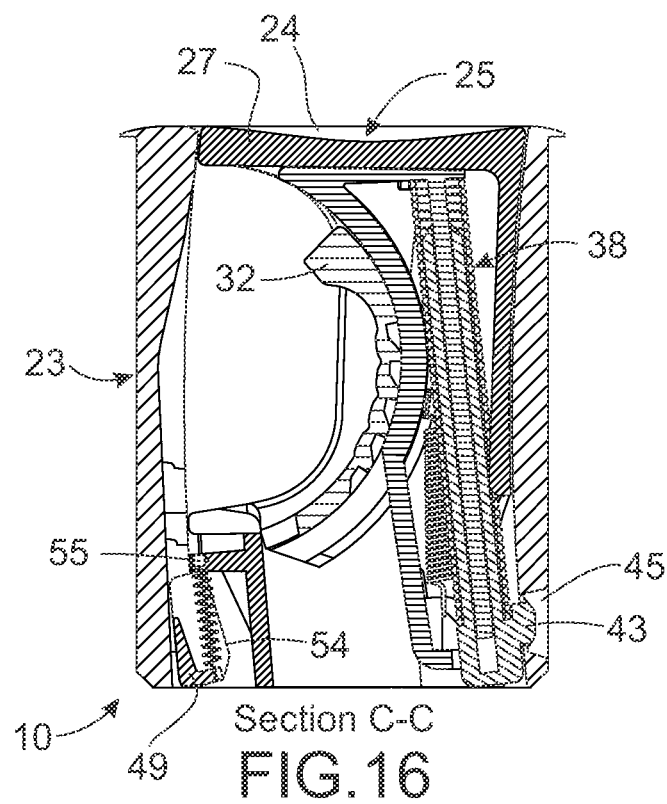
Figure 17:
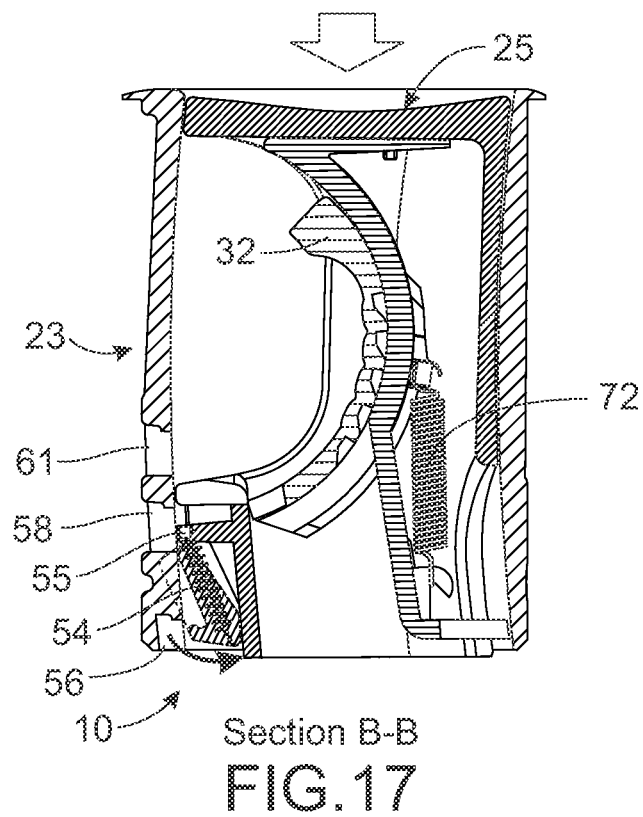

As shown in FIG. 11, a latch 49 may fit rockably within a closure member latch compartment 51 and includes a latching foot 50 and a latching foot 52. A spring 54 extends between a pin 55 on the closure member 25 and the latch 49 as shown in FIG. 15 to help bias the latch so that the foot 50 and the foot 52 engage axially spaced apart latch openings such as an elongated bottom latch opening 56 as best seen in FIGS. 12, 22, 23 and 24. Similarly, the latch foot 50 and the latch foot 52 may alternatively engage intermediate latch openings 58 and 59 for latching purposes. A pair of top latch openings 60 and 61 receives the latch foot 50 and the latch foot 52 for alternative latching purposes.

The closure member 25 may be generally tubular in shape with the top portion 27 and an open bottom end. The member 25 includes a cut-out opening 62 for permitting access to the plug end 16.

The assembly 29 includes a carrier 63 having a curved track 65, whereby its side edges receive a pair of reversely bent flanges 67 and 69 on the retainer 32 for enabling the retainer 32 to slide up and down in a curved path of travel relative to the fixed track 65.

As shown in FIGS. 9, 24 and 25, a retainer spring 72 may be connected between a hook 74 on the carrier 63 and a projection or pin 76 on the flange 69 of the retainer 32. In this manner, when the portal 10 is disposed in its open position as shown in FIG. 20 and the retainer is slid upwardly in a curved path of travel to its uppermost position, the spring 72 is stretched and in tension.

A rocker bar 78, as shown in FIGS. 14, 20 and 21, may be mounted rockably on the closure member 25 and includes a groove 81 for receiving a rounded projection or nib 83 on the carrier 63 for rocking back and forth in a generally vertical disposition when the portal 10 is mounted to a horizontal surface so that the portal extends vertically as shown in the drawings. The bar 78 may include a latch foot 85 for expanding into a body opening 87 as shown in FIG. 22 retain releasably the closure member in its fully extended upper opened position to stretch the spring 72.

A ratchet tooth 89 on the upper end of the bar 78 may extend into and through a track opening 92 to engage one of a series of ratchet grooves such as a bottom ratchet groove 94 on the back of the retainer 32. When the tooth 89 engages the bottom groove 94, it latches the retainer 32 in its uppermost opened position as shown in FIG. 20. In this position, the latch foot 85 engages the opening 87 to retain the closure member 25 in its opened position. As shown in FIG. 21, when a manually applied force is exerted on the portion 27 of the closure member 25, it moves downwardly relative to the body 23 and in so doing, the foot 85 is caromed out of engagement with the opening 87 to cause the bar 78 to rock about the projection 83 against the force of a leaf spring 95, which resiliently urges the tooth toward the groove, thereby causing the retainer 32 to snap downwardly along a curved path of travel to confine the cable 14 as indicated in FIG. 21.

Considering now the various modes of operation of the portal 10, with particular reference to FIGS. 5 through 8, when the closure member 25 is disposed in it opened position initially, as shown in FIG. 5, the retainer 32 is disposed in its lowermost position. In order to extend the cable 14 through the portal 10, the retainer 32 is slid into its uppermost position as shown in FIG. 6. Thereafter, the cable 14 can be readily extended through the portal 10 as shown in FIG. 7. When a downward pressure is applied to the closure member 25 has shown in FIG. 8, the retainer 32 snaps downwardly to confine the enlarged cable plug end 16.

Referring now to FIGS. 14 through 27, when the portal 10 is disposed in its closed or ready position as shown in FIG. 14, the latch 52 is held releasably engaged in the latch opening 56 at the bottom of the body 23 via the upward force from the main spring 38, thereby forcing the top of the latch 52 to have it press against the top left side of the opening 56. When a slight manual downward force is applied to the portion 27 of the closure member 25, the closure member moves slightly downwardly within the body 23 to permit the spring 54 to retract the latch 52 out of the opening 56 as shown in FIG. 15. This frees the closure member 25 to snap upwardly into its opened position as shown in FIGS. 18 and 19. As shown in FIG. 18, as the closure member 25 rises within the body 23, an enlarged upper portion 93 of the body 23 guides the closure member 25 slightly backwardly. Also, the latch spring 54 forces the latch foot 52 to assume a position holding the bottom of the latch 49 against the front side of the body 23. As best shown in FIG. 19, at the fully opened position of the portal 10, the latch 49 passes over center of the spring 54. When the top of the latch 49 moves sufficiently inwardly to the right, the bottom of the latch 49 changes force suddenly (changes state) and the latch spring 54 then presses the bottom of the latch 49 against the inner front portion of the body 23.

The retainer 32 can be slid manually upwardly into its uppermost position as shown in FIG. 20. In so doing, the leaf spring 95 urges the latch foot 85 to engage the body opening 87 to retain the closure member 25 in its opened position. The leaf spring 95 also resiliently urges the ratchet tooth 89 into the bottommost ratchet groove 94 once the retainer 32 is moved to its opened position as shown in FIG. 20. As shown in FIG. 21, a manually applied downward pressure to the closure member 25 causes the retainer 32 to snap downwardly under the force of the spring 72 until it bottoms against the closure member 25, to retain the cable 14 in its desired position. As shown in FIG. 22, the retainer 36 confines the cable 14 relative to the closure member 25 so that the plug end 16 is inhabited from falling under the force of gravity back into the portal 10. In FIG. 22, the latch foot 52 engages the intermediate body opening 52 under the force of the spring 52. The user controls how far down to lower the closure member 25. The latch foot 52 will first engage the upper opening 61, but with further pressure on the closure member 25, the foot 52 will then enter the intermediate opening 58 as indicated in FIG. 22. After releasing the manually applied pressure after an audible click, the spring 54 and the main spring 72 cause the top of the latch 49 to be urged to the left, thereby passing over center and changing state. The bottom of the latch 49 is pulled to the right and is ready for the next movement.

A slight downward pressure on the closure member 25 causes the latch foot 52 to back out of the opening 58 under the force of the spring 54 as best seen in FIG. 24. When the spring 47 raises the closure member 25 to its opened position as shown in FIG. 25, the latch 49 assumes the position as previously described in connection with FIG. 18.

Figure 26:
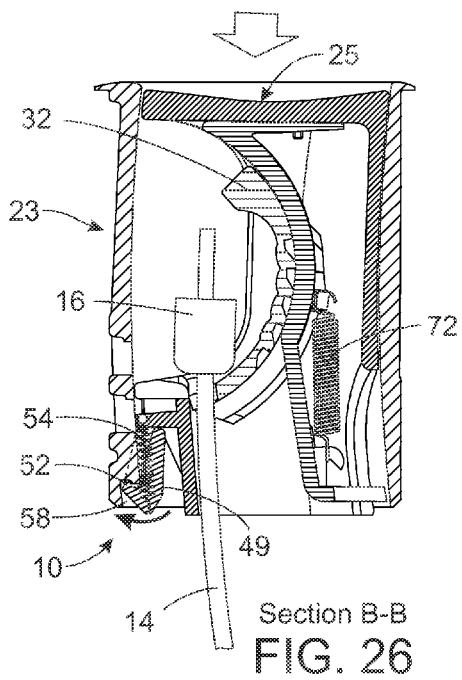

When the closure member 25 is pushed down to its lowermost closed position as shown in FIG. 26, the closure member 25 is closed completely. The latch foot 52 moves into the bottom opening 58 to retain the closure member 25 against the force of the spring 72. When the finger pressure is removed from the closure member 25, the main spring 72 urges the top of the latch 49 to the left and changes state at the bottom thereof, to thereby change the state of the portal 10 to its ready state.

Figure 28:
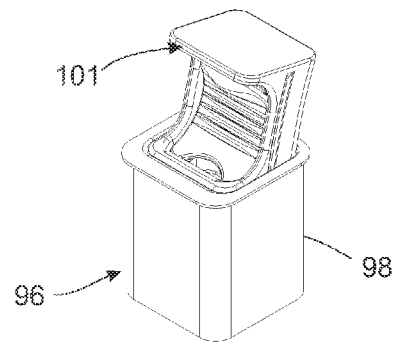
FIG. 28 is a pictorial view of another portal, which is constructed in accordance with another embodiment of the invention.
Figure 27:
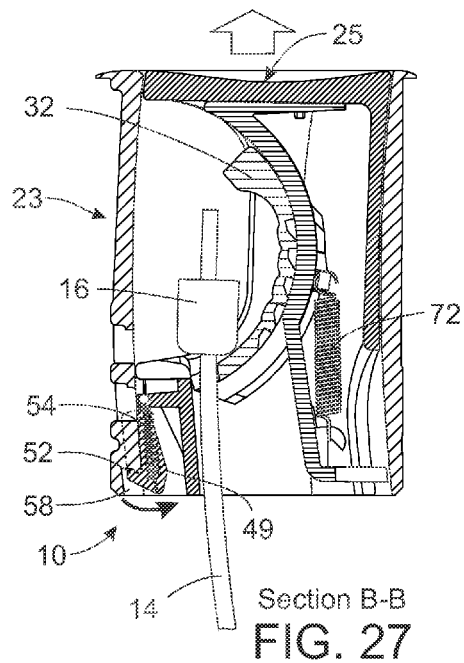

Referring now to FIG. 28, there is shown a portal 96, which is similar to the portal 10, and which is constructed in accordance with another embodiment of the invention. The portal 96 has a body 98 which receives telescopically a closure member 101, that operates in a similar manner as the portal 10. The only difference being the cross sectional shape of the body 98 and of the closure member 101, to illustrate that various different cross-sectional shapes of the body and the closure member may be employed. The cross-sectional shape of the body 96 and the member 101 is generally square in shape.

Figure 29:
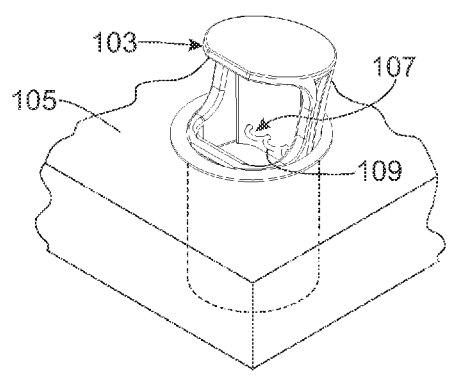
FIGS. 29 and 30 are pictorial views of a further portal, which is constructed in accordance with a further embodiment of the invention.
Figure 30:
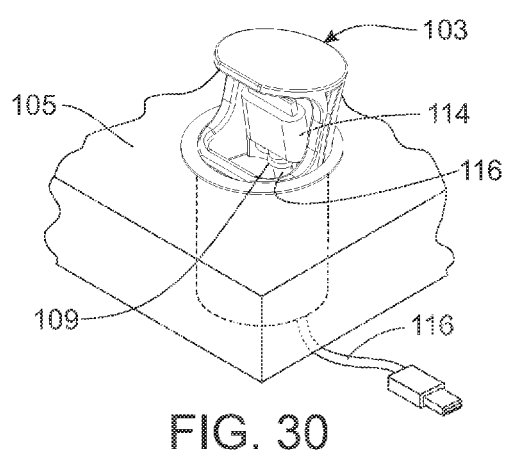

Referring now to FIGS. 29 and 30, there is shown a portal 103, which is also constructed in accordance with a further embodiment of the invention and which is similar to the portal 10 except that the portal 103 has an alternative retainer. The portal 103 is adapted to be fixed to a mounting surface 105 in a manner similar to the portal 10, and includes a retainer 107 in the form of a pair of spring clips 109 for releasable confining a cable 116 having a plug end 114 in a desired position within the portal 103.

Figure 33:
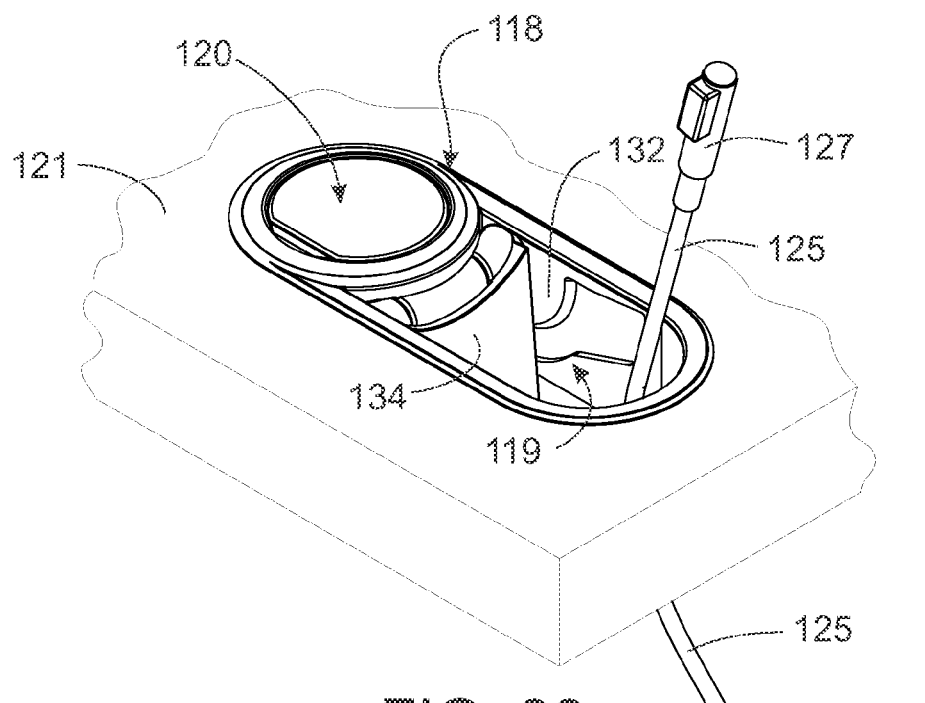
Figure 34:
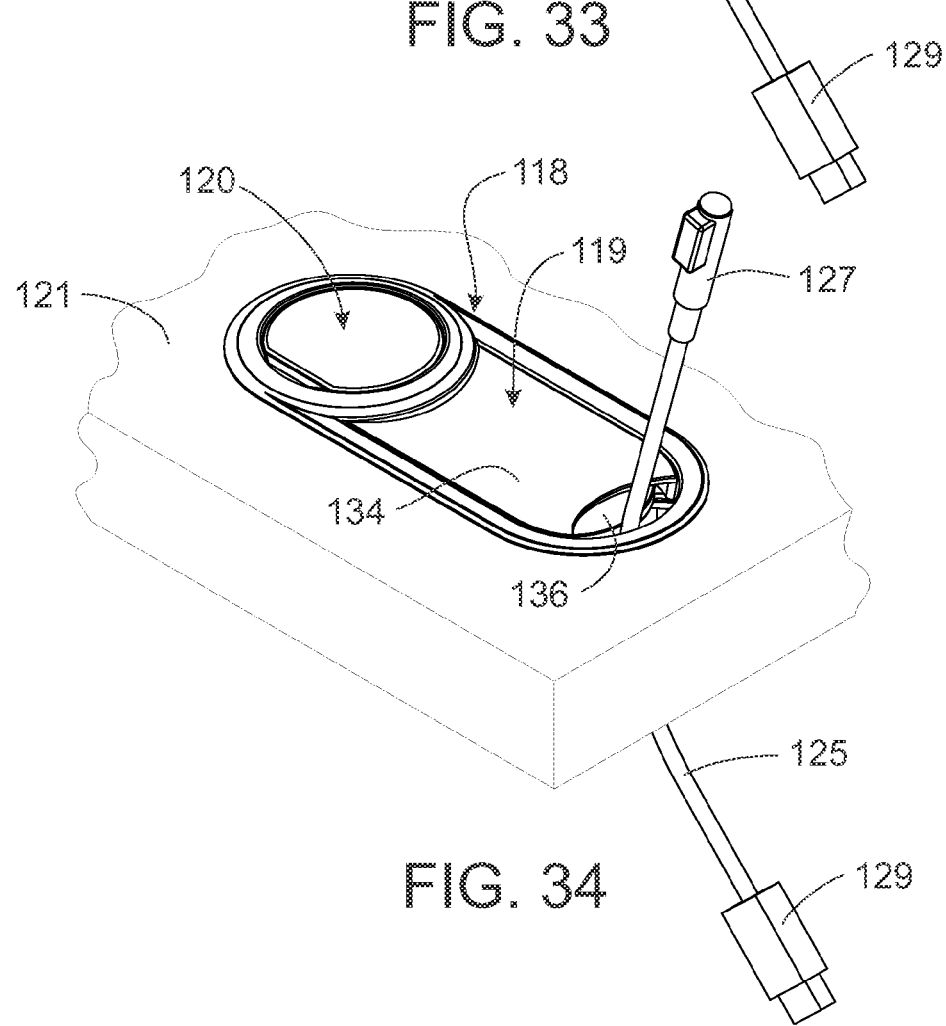
Figure 40:
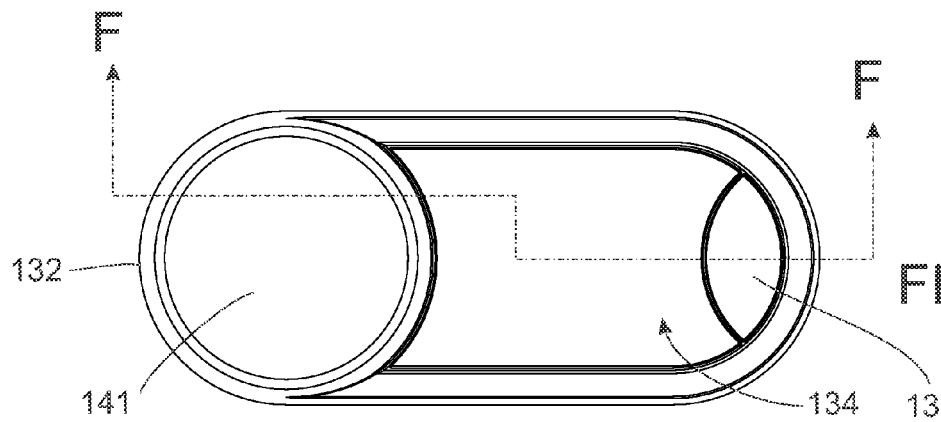
FIG. 40 is a plan view of the portal assembly of FIG. 31.

Referring now to FIGS. 31 through 43, there is shown a portal assembly 118, which may include both a large opening portal 119 and a portal 120 similar to the portal 10. The portal assembly 118 is constructed in accordance with a further embodiment of the invention, and is adapted to be mounted to a mounting surface 121 within a mounting opening 123 therein. As shown in FIG. 33, a cable 125 having a plug end 127 and a connector 129 at the opposite end thereof, may be confined within the portal 119 as indicated in FIG. 34. It is to be understood that the assembly may be mounted in a horizontal disposition as shown, but may also be mounted in other orientations as desired.

The portal assembly 118 includes an oval body 132 having a large elongated opening 133 at one end thereof. A closure member 134 is able to be pushed manually downwardly into a position as indicated in FIG. 33 for receiving the cable 125. The body 132 may have different shapes and sizes. A retainer 136 retracts and advances as the closure member is pushed manually downwardly within the body 132 and then released to permit the closure member to snap back toward or into a substantially coplanar configuration with respect to the upper surface 121 and the opening 132 to confine the cable 125 in the position as indicated in FIG. 34. It is important to note that several different cables may be retained in the portal 119 at the same time.

As best seen in FIG. 35, the body 132 includes a circular body opening 141 which receives fractionally the portal 120. The portal 120 is similar to the portal 10 and provides the same pop-up feature as the portal 10. Optionally, the portal 120 may not be employed in the portal assembly 118 and the circular opening 141 may then serve as a grommet to manage any cables extending from below the surface 121. Alternatively, it will become apparent to those skilled in the art, that the portal 119 may be employed without the necessity of the opening 141 and/or the portal 120 being combined therewith.

As seen in FIG. 35, the portal 119 includes a closure member and retainer assembly 143 mounted pivotally to the body 132 swinging between a horizontal closed position and a downwardly disposed opened position.

The closure member 134 includes a top closure plate 145 having a curved cut-out opening 146 to facilitate receiving the cable 125. A bottom closure plate 147 has a similar curved cut-opening 148. The retainer 136 is slidably mounted between the plates 145 and 147 to retract from and extend within the cut-out openings 146 and 148. A pair of pins 149 and 152 extend from the rear end of the bottom plate 147 and into respective openings 154 and 156 in the body 132 for pivotally mounting the assembly 143 to the body 132. A spring 158 surrounds the pin 149 to resiliently bias the assembly 143 into its closed position.

Figure 31:
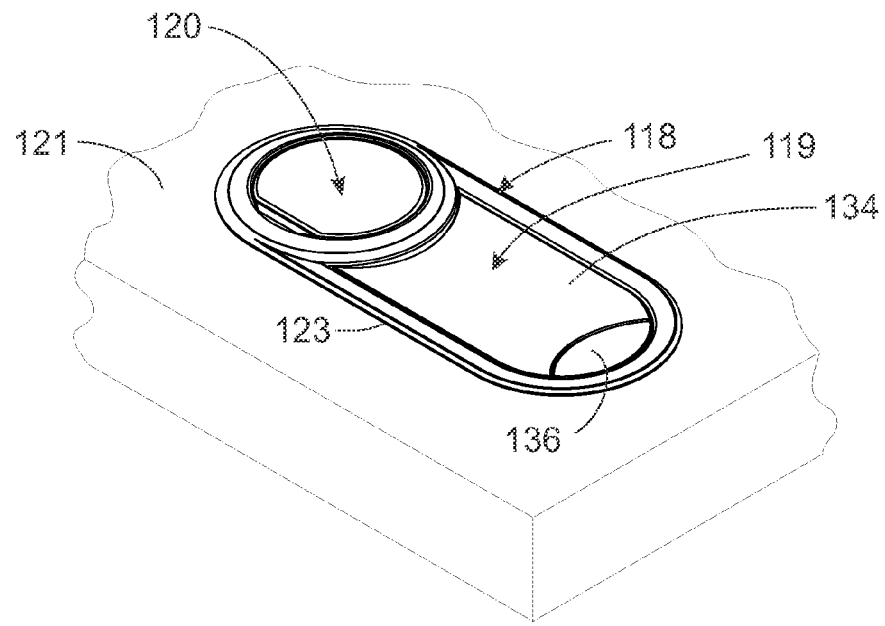
FIGS. 31 through 34 are pictorial views of a portal assembly, which is constructed in accordance with yet another embodiment of the invention, and which illustrates a sequence of operations to facilitate the installation of cables therein.
Figure 32:
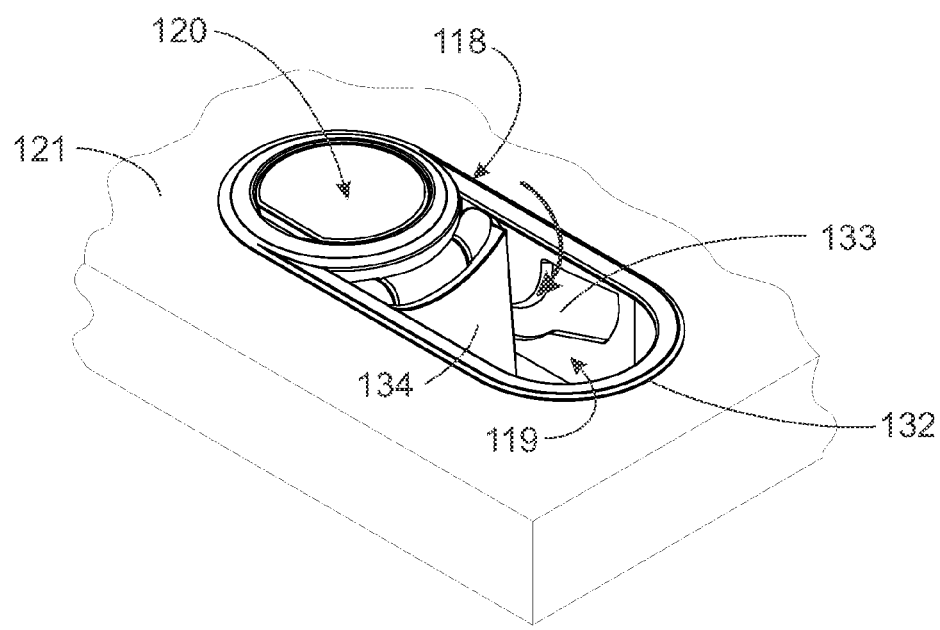

The retainer 136 includes an elliptically shaped raised portion 161 which is complementary shaped relative to the cut-outs 146 and 148 so that when the closure member 134 is disposed in its closed position, as shown in FIG. 31, the raised portion 161 of the retainer 136 closes over and is coplanar with the upper closure member plate 145.

Figure 41:
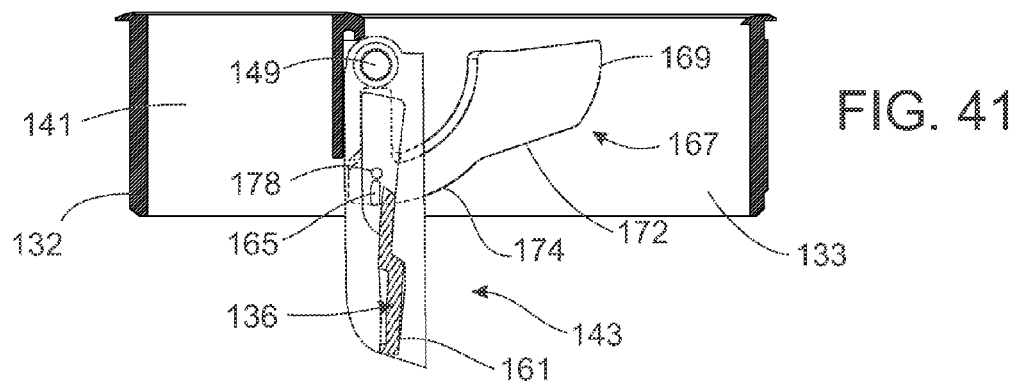
FIGS. 41 through 43 are sectional views of the portal assembly of FIG. 36.
Figure 42:
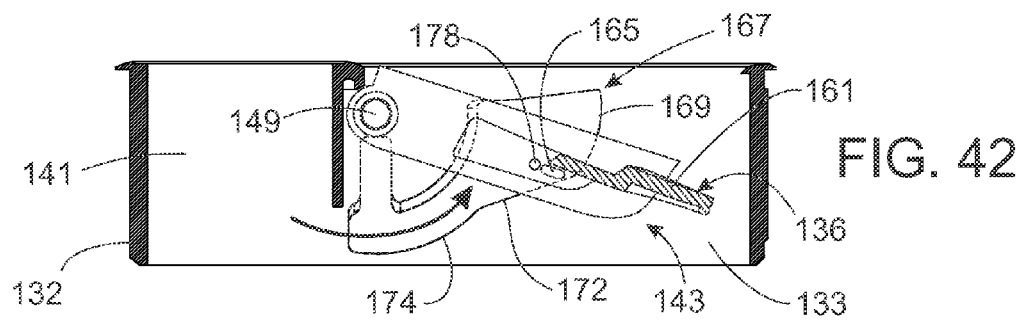
Figure 43:
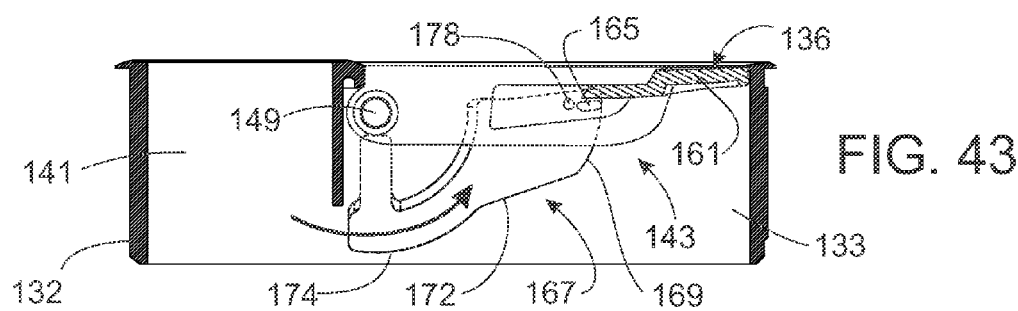

In order to retract and advance the retainer 146, the retainer drive mechanism 138 includes a pair of raceway followers or ears 163 and 165 extending from opposite sides of the retainer 136 to engage a pair of oppositely disposed raceways such as the raceway 167 on the inner surfaces of the body 132, the follower 165 engaging the raceway 167. When a manual downward force is applied to the closure member 134, the closure member and retainer assembly 143 swings downwardly within the body 132 and the retainer 136 retracts into the space between the plate 145 and 147. As the followers 163 and 165 are guided along the raceways, the retainer 136 retracts relative to the closure member plate 145 and 147. The followers such as the follower 165 moves along the raceway 167 from its top steep curved portion 169 to an intermediate linear portion 172 and then a bottom shallow curved portion 174 as best seen in FIGS. 41 through 43.

In order to advance the retainer 136 from its retracted position, a pair of retainer springs 176 and 177 are connected between respective pins or projections 178 and 179 on the retainer 136, and respective pins or projections 180 and 181 on the lower plate 147 of the closure member 134. When the retainer 136 retracts against the force of the springs 176 and 177 and then is carried upwardly with the closure member 134 toward the closed position, once the followers such as the follower 165 engages the top curved portion 169 of the raceway 167, the retainer 136 is released and the springs 176 and 177 cause the retainer to snap back to confine the cable or cables in a desired position with their plug ends above and outside of the body 132.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A portal for routing at least one electrical cable having an enlarged plug end through a hole in a mounting surface, comprising:
   a portal body for fitting into the mounting surface hole;
   the body having a cable opening therein for permitting the plug end of the at least one cable to pass between being disposed within the portal body and outside thereof;
   a closure member having a portion configured to the size and shape of the body opening for moving between a closed position and an opened position;
   the closed position being one where the closure member is substantially coplanar with the mounting surface;
   the opened position being where the closure member is disposed substantially away from the coplanar relationship with the cable opening to permit the plug end of the at least one cable to be moved from the portal body to a position away from the portal body;
   a retainer moveably mounted to the closure member for confining the cable in a desired position; and
   retainer drive mechanism for moving the retainer as the closure member moves from its opened position toward its closed position to confine the cable in the desired position to inhibit the plug end of the at least one cable from moving back toward the portal body and for permitting the plug end of the at least one cable to be pulled substantially freely away from the body.

2. A portal according to claim 1, wherein the closure member snaps out of the body to carry a cable plug out of the body.

3. A portal according to claim 1, wherein the closure member is pivotally mounted to the body and swings between its closed position and its opened position.

4. A portal according to claim 3, further including a closure spring for urging resiliently the closure member toward its closed position in its coplanar relationship with the opening.

5. A portal according to claim 3, wherein the closure member is elongated in shape and has a cut-out end portion, and wherein the retainer is movable within the cut-out end portion.

6. A portal according to claim 5, wherein the retainer drive mechanism includes at least one race follower for engaging a raceway in the portal body for causing the cable engaging edge of the retainer to retract relative to the closure member cut-out end portion as the closure member swings away from its closed position.

7. A portal according to claim 3, wherein the body includes a portal receiving opening and receives a device of claim 2 to fit within the portal opening.

8. A portal for routing at least one electrical cable having an enlarged plug end through a hole in a mounting surface comprising:
   a portal body for fitting into the mounting surface hole;
   the body having a cable opening therein for permitting the plug end of the at least one cable to pass between being disposed within the portal body and outside thereof;
   a closure member having a portion configured to the size and shape of the body opening for moving between a closed position and an opened position;
   the closed position being one where the portion of the closure member substantially closes over and is substantially coplanar with the mounting surface and the cable opening in the portal body;
   the opened position being where the closure member is disposed substantially away from the coplanar relationship with the cable opening; and a retainer mounted to the closure member for confining the cable plug and the retainer for causing the closure member to carry the plug end away from the body to present the cable plug end to the user;

whereby the plug end can be pulled manually substantially freely away from the cable opening after being presented to the user.

9. A portal according to claim 8, where the body and the closure member are each generally tubular in shape, the closure member having a cut away front portion, the retainer being moveably mounted relative to the tubular closure member and having a curved cable confining edge at its bottom end portion.

10. A portal according to claim 8, wherein the closure member carries a cable plug end into the body as the closure member moves downwardly to its closed position.

11. A portal for routing at least one electrical cable having an enlarged plug through a hole in a mounting surface comprising:

a body for fitting into the mounting surface hole, the body having a cable opening therein for permitting the plug end of the at least one cable to pass between the portal body and outside thereof;

a closure member having a portion configured to the size and shape of the body opening for moving between a closed position and an opened position;

the closed position being one where the portion of the closure member substantially closes over and is substantially coplanar with the mounting surface and the cable opening in the portal body;

the opened position being where the closure member is disposed substantially away from the coplanar relationship with the cable opening to permit the plug end of the at least one cable to be installed and extend through the cable opening;

a closure spring for urging resiliently the closure member into the closed position; and a movable retainer mounted to the closure member for confining the cable in a desired position to prevent the plug end from moving back toward the portal body and for permitting the cable to be pulled manually substantially freely away from the cable opening when the closure member is disposed in its closed position.

12. A portal according to claim 11, wherein the closure member is pivotally mounted to the body and swings between its closed position and its opened position.

13. A portal according to claim 11, further including a closure spring for urging resiliently the closure member toward its closed position in its coplanar relationship with the opening.

14. A portal according to claim 11, wherein the closure member is elongated in shape and has a cut-out end portion, and wherein the retainer is movable within the cut-out end portion.

15. A portal according to claim 11, further including a retainer drive mechanism including at least one race follower for engaging a raceway in the portal body for causing the cable engaging edge of the retainer to retract relative to the closure member cut-out end portion as the closure member swings away from its closed position.

16. A portal according to claim 11, wherein the body includes a portal receiving opening and receives a device of claim 2 to fit within the portal opening.

17. A portal according to claim 11, wherein the retainer drive mechanism includes at least one spring.

18. A portal according to claim 11, wherein the retainer includes a raised portion to be substantially coplanar with the closure member in its closed position.

19. A portal according to claim 11, further including a retainer drive mechanism for moving the retainer toward the cable.

* * * * *